United States Patent
Hearn

[15] 3,653,765
[45] Apr. 4, 1972

[54] ACOUSTO-OPTIC LIGHT SPECTRUM ANALYSIS

[72] Inventor: John R. Hearn, Los Altos Hills, Calif.
[73] Assignee: Hewlett-Packard Company, Palo Alto, Calif.
[22] Filed: June 17, 1970
[21] Appl. No.: 47,044

[52] U.S. Cl. ...........................356/81, 350/149, 350/161, 356/93
[51] Int. Cl. .........................................G01j 3/28, G01j 3/32
[58] Field of Search..................350/150, 151, 160, 161, 149; 356/74, 76, 77, 80, 81, 83, 84, 95, 93

[56] References Cited

UNITED STATES PATENTS

| | | | |
|---|---|---|---|
| 3,011,386 | 12/1961 | Rosenthal | 356/83 |
| 3,171,882 | 3/1965 | Baird | 356/81 |
| 3,409,373 | 11/1968 | Matthews | 356/95 X |
| 3,012,467 | 12/1961 | Rosenthal | 356/83 |

OTHER PUBLICATIONS

Harris et al.: "Acousto–Optic Tunable Filter," Journal of the Optic Society of America, Vol. 59, No. 6, June 1969, pp. 744–747

Harris et al.: "Electronically Tunable Acousto–Optic Filter" Applied Physics Letters, Vol. 15, No. 10, Nov. 15, 1969, pp. 325 and 326

Dixon: "Acoustic Diffraction of Light in Anisotropic Media," IEEE Journal of Quantum Electronics, Vol. QE-3, No. 2, Feb. 1967 pp. 85–93

*Primary Examiner*—Ronald L. Wibert
*Assistant Examiner*—F. L. Evans
*Attorney*—A. C. Smith

[57] ABSTRACT

An acousto-optic light spectrum analysis method and apparatus is disclosed. A linearly polarized unknown light beam to be spectrum analyzed is collinearly diffracted on an acoustic wave in an optically anisotropic medium to diffract light of the first linear polarization and of a frequency related to the frequency of the acoustic wave into light of a second polarization. The diffracted unknown light beam is polarization analyzed to separate the light of the second polarization from the light of the first polarization. The frequency of the acoustic wave is swept and the light of the second polarization is detected as a function of the sweep to obtain a spectrum analysis of the unknown light beam. The output spectrum of the unknown light beam is calibrated by switching a known light source through the acousto-optic system for calibration of the output spectrum.

2 Claims, 2 Drawing Figures

PATENTED APR 4 1972　　3,653,765

INVENTOR.
JOHN R. HEARN

ACOUSTO-OPTIC LIGHT SPECTRUM ANALYSIS

BACKGROUND OF THE INVENTION

Heretofore, optical frequency spectrum analyzers have been built wherein an unknown light beam has been shown onto a diffraction grating or into a prism to obtain a spatial separation of the optical frequency components of the unknown light beam for separate detection thereof.

It is also known from the prior art that the bandpass characteristics of an acousto-optic filter can be tuned over a relatively wide range of optical frequencies by producing a corresponding frequency change in a radio frequency acoustic wave excited in the acousto-optic element. More particularly in such prior art systems, light of a first polarization was collinearly diffracted from a radio frequency acoustic wave in a birefringent crystal to shift the polarization of the light beam from a first polarization to a second polarization. The output light was then polarization analyzed to pass only light of the second polarization. The frequency of the light of the second polarization was variable in accordance with variations in the frequency of the radio frequency acoustic wave within the crystal. Such electrically tunable acousto-optic filters have been characterized by instantaneous bandwidths of approximately 2 A. tunable from 5,000 to 7,500 A. by varying the frequency of the radio frequency acoustic wave within the crystal from 1,050 MHz to 750 MHz. Such a tunable acousto-optic filter is disclosed in an article titled "Acousto-Optic Tunable Filter", appearing in the *Journal of the Optical Society of America*, Volume 59, No. 6, of June 1969, pgs. 744–747 and in an article America, tilted "Electronically Tunable Acousto-Optic Filter" appearing in the Applied Physics Letters, Volume 15, No. 10, of Nov. 15, 1969, pages 325–326.

SUMMARY OF THE INVENTION

The principal object of the percent invention is the provision of an improved optical spectrum analyzer.

One feature of the present invention is the provision of an acousto-optic light spectrum analysis method and apparatus wherein an unknown light beam to be spectrum analyzed is collinearly diffracted on an acoustic wave in an optically anisotropic medium to diffract light of the unknown beam of a first polarization and of an optical frequency related to the acoustic frequency into light of a second polarization, polarization analyzing the diffracted light to separate the light of the second polarization from the light of the first polarization, sweeping the frequency of the acoustic wave to produce a corresponding sweep of the optical frequency of the light diffracted into the second polarization and detecting the light of the second polarization as a function of the sweep to obtain a spectrum analysis of the unknown light beam.

Another feature of the present invention is the same as the preceding feature including the provision of a known light beam having a predetermined spectral poser density and time sharing the acousto-optic element and detection system between the known and unknown beam to produce an output for calibrating the intensity of the detected spectrum of the unknown light beam.

Another feature of the present invention is the same as any one or more of the preceding features including the provision of controlling the acoustic power density in the acoustooptic device, as a function of the frequency of the acoustic wave, in accordance with the detected calibration reference intensity of a known light beam for automatically calibrating the intensity of the optical spectrum derived from the unknown light beam.

Other features and advantages of the present invention will become apparent upon a perusal of the following specification taken in connection with the accompanying drawings wherein:

DESCRIPTION OF THE PREFERRED EMBODIMENTS

Figure 1:
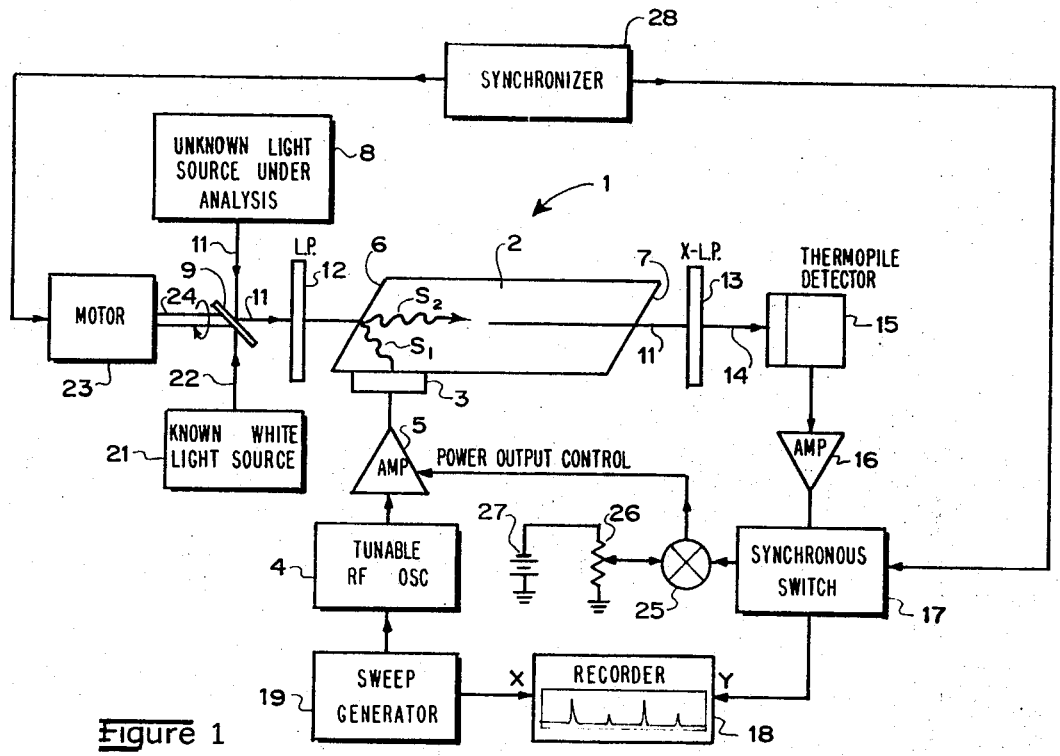
FIG. 1 is a schematic line diagram, partly in block diagram form, depicting an acousto-optic light spectrum analyzer incorporating features of the present invention.

Referring now to FIG. 1, there is shown an acousto-optic light spectrum analyzer 1 incorporating features of the present invention. The light spectrum analyzer 1 includes an optically anisotropic medium 2, such as birefringent crystal. Suitable examples for the birefringent crystal include $LiNbO_3$, $PbMpO_4$, $CaMoO_4$ or quartz. An acoustic transducer 3 is acoustically coupled to the crystal 2 near one end thereof for generating a shear wave $S_1$ in the crystal at an acoustic frequency determined by the output of a tunable radio frequency oscillator 4. The output of the tunable oscillator 4 is amplified by a power amplifier 5 before application to the acoustic transducer 3. The generated shear wave $S_1$ is directed against the input face 6 of the crystal and reflected and converted into a second shear wave $S_2$ propagating longitudinally of the crystal 2 along the longitudinal axis interconnecting the input face 6 and the output face 7 of the crystal 2. Faces 6 and 7 are parallel and cut a an angle relative to the longitudinal axis of the crystal 2 such that the sound wave $S_1$ will be reflected from face 6 along the longitudinal axis of the crystal 2.

An unknown light source under analysis 8 is disposed to direct the beam of light emanating therefrom against a mirror 9 disposed at 45° to the longitudinal axis of the crystal 2 such that the unknown light beam 11 is reflected from the mirror 9, and passes through a linear polarizer 12 for polarizing the unknown light of beam 11 in a first linear direction, such as in the vertical direction, before passage thereof into the crystal 2.

In the crystal 2, the unknown light beam of the first polarization is collinearly diffracted on the acoustic wave. In the diffraction process an optical frequency component of the unknown light, if any, which is related to the frequency of the acoustic wave $S_2$ is diffracted from the first polarization into a second polarization orthogonal to the first polarization. Light of other frequencies than the particular frequency, which is related to the acoustic frequency, passes through the crystal 2 with the light beam 11 and retains the first polarization. The collinearly diffracted light beam 11 which emerges from the crystal 2 is passed through a crossed linear polarizer having a polarization direction the same as the direction of the second polarization within the crystal 2 such that light within the output beam 11 of the second polarization passes through the crossed polarizer 13 as output crossed polarized light beam 14. Light of the first polarization in the output beam 11 is rejected by the crossed polarizer 13 and is excluded from the output beam 14.

For a given acoustic frequency $f_a$ only a small range of light frequencies will satisfy a momentum $\bar{k}$ vector matching condition within the birefringent crystal, and only this small range of light frequencies will be cumulatively collinearly diffracted into the second polarization. If the acoustic frequency is changed, the band of light frequencies which the crystal will diffract from the first polarization into the second polarization is likewise changed. Diffraction of the light from the first polarization into the second orthogonal polarization occurs, for a lithium niobate crystal, via the $P_{41}$ photoelastic constant. The momentum vector matching condition necessary for cumulative collinear diffraction occurs if the following momentum vector condition is satisfied, namely, $|k_o|-|k_e|=|k_a|$ where the $_{o, e}$ and $_a$ denote the ordinary and extraordinary optical waves, and the acoustic wave, respectively. This momentum vector condition will be the case if the optical and RF acoustic frequencies $f_o$ and $f_a$ are related by:

$$f_o = (cf_a/V|\Delta n|) \qquad (1)$$

where $c/V$ is the ratio of the optical velocity in vacuum to the acoustic velocity in the medium, and $\Delta n$ is the birefringence of the crystal.

Thus, in a typical example employing lithium niobate as birefringent material, the band of light frequencies which is diffracted from the first polarization into the second polarization is tunable from 7,000 to 5,500 A. by changing the acoustic frequency from 750 MHz to 1,050 MHz. The instantaneous bandpass for these tunable frequencies is less than 2 A. for a crystal 5 cm. long. Output beam 14 is fed to a thermopile detector such as a Hewlett-Packard Model 8334A detector for producing a voltage proportional to the intensity of the light in output beam 14. The output voltage from thermopile detector 15 is fed to amplifier 16 wherein it is amplified and thence fed to the X axis of an Xy recorder 18 via a synchronous switch 17. A sweep generator 19 supplies one output to the tuning control channel of the tunable RF oscillator 4 for sweeping the frequency of the oscillator 4 across a radio frequency band, frequencies corresponding to the desired sweep of optical frequencies of the spectrum of optical frequencies to be analyzed. Another output of the sweep generator is fed to the Y axis of the XY recorder 18 such that the recorder 18 records the spectrum of the unknown light source 8 under analysis.

The percentage of incident light, within the bandpass of acousto-optic crystal 2, that is converted from the first polarization to the second polarization varies inversely as the square of the acoustic frequency for a given acoustic power density. This means that the spectrum recorded by recorder 18 either needs special calibration as regards amplitude of the spectral lines or means can be increasing the acoustic power density within the crystal 2 in accordance with the frequency of oscillator 4 to obtain a flat amplitude response over the tunable bandwidth of the spectrum analyzer.

Automatic calibration to obtain flat amplitude response from the spectrum analyzer is achieved by provision of a known white light source 21 providing a reference light beam 22 with uniform spectral power density over the optical spectrum to be spectrum analyzed. The known reference light beam from the source 21 is directed onto mirror 9 which is rotated via a motor 23 connected to the mirror via shaft 24. The axis of rotation from the mirror 9 is perpendicular to the plane containing light beams 11 and 22.

When the mirror 9 is in the proper position, the reference light beam 22 is directed through the linear polarizer 12 and thence through the crystal 2 for collinear diffraction on the acoustic wave therein to diffract light from the reference light beam 22 of the first polarization into the second polarization. The reference component diffracted from the first polarization to the second polarization passes through the output polarization analyzer 13 and is detected by thermopile detector 15. The reference detected signal is amplified by amplifier 16 and switched via synchronous switch 17 to one input of an error detector 25 for storage and comparison with a DC reference signal derived from a reference potentiometer 26 which is supplied with voltage from a stable voltage source 27.

The selected reference amplitude signal is compared with the detected reference amplitude signal in error detector 25 to produce an error signal which is fed to the gain control input of power amplifier 5 for controlling the acoustic power density within the crystal 2 to maintain the desired detected reference output for the reference light level to provide a flat bandpass transfer characteristic over the spectral range of the spectrum analyzer.

A synchronizer 28 which may comprise, for example, merely the same shaft as shaft 24 for the mirror 9 synchronizes rotation of the mirror 9 with the switching action of the synchronous switch 17 such that when the unknown light is passing through the acousto-optic spectrum analyzer 1, the synchronous switch switches the output of amplifier 16 to the input of the recorder 18 and when the reference known white light source is illuminating the acousto-optic crystal 2 the synchronous switch switches the output of amplifier 16 to the error detector 25.

As an alternative to the output of the error detector 25 being fed to the gain control of power amplifier 5 it may be fed to a similar gain control in amplifier 16. The time constant for the error output of error detector 25 is such that the output error signal remains substantially constant over a complete rotation of the mirror 9.

Figure 2:
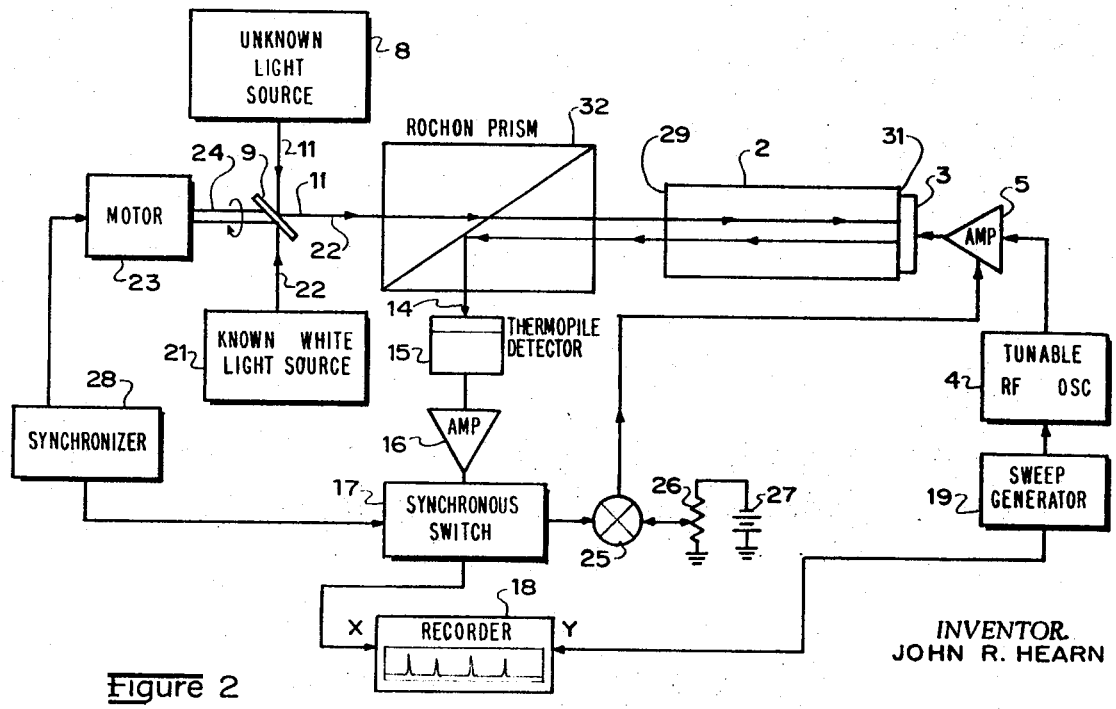
FIG. 2 is a schematic line diagram, partly in block diagram form, depicting an alternative embodiment of a light spectrum analyzer incorporating features of the present invention.

Referring now to FIG. 2, there is shown an alternate optical spectrum analyzer incorporating feature of the present invention. The system of FIG. 2 is substantially the same as that of FIG. 1 with the exception that the optically anisotropic medium, birefringent crystal 2, has end faces 29 and 31 cut at right angles to the longitudinal axis of the crystal 2. The acoustic transducer is affixed to end face 31 and an optically reflective coating is provided at the interface between end face 31 of crystal 2 and the adjoining face of the acoustic transducer 3. The crystal 2 is preferably of such a length and is provided with acoustic wave absorptive material such that the crystal is not acoustically resonant. In addition, the input and output optical polarizers are replaced by a Rochon polarizing prism 32 disposed to pass light from the mirror into the crystal 2 with a first direction of linear polarization and to reflect light of the orthogonal polarization passing in the opposite direction as output beam 14.

The incident light on the birefringent crystal 2 propagates collinearly of the acoustic wave within the crystal for collinearly diffracting light of the first polarization and of the frequency related to the acoustic wave frequency into light of the second polarization. Upon reflection of the light from the end face 31, the light beam continues to collinearly diffract on the acoustic wave traveling in the opposite direction. The light that has been diffracted from the first polarization to the second orthogonal polarization is reflected into output beam 14 from the Rochon prism 32, whereas light of the first polarization passes through the Rochon prism back to the light source.

As used herein "light" is defined as electromagnetic radiation. Such light need not be confined to the visible spectrum. In some birefringent crystals, the phase velocity and group velocity vectors for the acoustic wave are divergent and may diverge by as much as 20°, as is obtained in the case of quartz. In such a case, the light beam path may be collinear with either the phase or group velocity of the acoustic wave to obtain the "phase matched" collinear diffraction described herein. Therefore, as used herein "collinear" means that the light beam path is collinear with either the phase or group velocity of the acoustic wave.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

RELATED CASES

The provision of a closed loop control of the output light beam intensity as a function of acoustic frequency and the provision of means for sweeping the frequency of the output light beam are disclosed and claimed in copending U.S. application Ser. No. 047,358 filed June 18, 1970 and assigned to the same assignee as the present invention. Also control of the output light beam intensity via control of the acoustic power density is disclosed and claimed in copending U.S. application Ser. No. 046,911 filed June 17, 1970 and assigned to the same assignee as the present invention.

I claim:

1. In a method for analyzing the optical spectrum of an unknown light beam the steps of, exciting an acoustic wave in an optically anisotropic medium at a frequency related to the optical frequency to be analyzed within the optical spectrum of the unknown light beam; plane polarizing light applied to said anisotropic medium; alternately collinearly diffracting on the acoustic wave within the optically anisotropic medium the unknown light beam to be analyzed and a light beam of known spectral power density for alternately diffracting the unknown light and known light of the optical frequency related to the frequency of the acoustic wave from unknown light of a first polarization to unknown light of a second polarization and known light of the first polarization to known light of the second polarization; separating the unknown and known light beams of the second polarizations from the corresponding unknown and known light beams of the first polarizations; detecting in synchronism with the alternating collinear diffraction of unknown and known light beams the respective spectral components of the unknown and known light beams alternately diffracted from the first to the second polarizations to obtain from the intensity of the detected spectral components of the known light of the second polarization a calibration reference intensity electrical signal for calibrating the intensity of the corresponding detected spectral component of the unknown light of the second polarization; altering the frequency of the acoustic wave to produce a corresponding change of the optical frequency of the unknown and known light diffracted from the first to the second polarizations; controlling the acoustic power density of the acoustic wave in the anisotropic medium in response to the calibration reference intensity electrical signal as the frequency of the acoustic wave is altered; and producing an output indication of the light diffracted into the second polarization as a function of optical frequency to obtain a spectrum analysis of the unknown light beam.

2. In an acousto-optic spectrum analyzing apparatus, optically anisotropic medium means, means for exciting an acoustic wave in said optically anisotropic medium means have optically frequency related means; intensity to an optical frequency to be analyzed within the optical spectrum of an unknown light beam; means for linearly polarizing light applied to said optical anisotropic medium means means for alternately applying to said optically anisotropic medium means the unknown light beam to be analyzed and a light beam of known spectral power density for alternately collinearly diffracting the unknown light beam and the known light beam on the acoustic wave within said optically anisotropic medium means to alternately diffract the unknown light of a first polarization and of the optical frequency to be analyzed into light of a second polarization and the known light of the first polarization and of the optical frequency to be analyzed into light of the second polarization; means for analyzing the polarization of the diffracted light beam to separate the unknown and known light of the second polarization from the corresponding unknown and known light of the first polarization; means detecting synchronously with the alternating collinear diffraction of unknown and known light beams the respective spectral components of the unknown and known light beams alternately diffracted into the second polarizations from the first polarizations to produce from the intensity of the detected spectral components of the known light of the second polarization a calibration reference intensity electrical signal for calibrating the intensity of the corresponding detected spectral component of the unknown light of the second polarization; means for altering the frequency of the acoustic wave to produce a corresponding change in the optical frequency of the unknown and known light diffracted from the first to the second polarizations; means for controlling the acoustic power density of the acoustic wave in said anisotropic medium means in response to the calibration reference intensity electrical signal as the frequency of the acoustic wave is altered; and means for synchronously producing an output indication of the unknown light diffracted into the second polarization to obtain a spectrum analysis of the unknown light beam.

UNITED STATES PATENT OFFICE
CERTIFICATE OF CORRECTION

Patent No. 3,653,765　　　　　　　　Dated April 4, 1972

Inventor(s)　John R. Hearn

It is certified that error appears in the above-identified patent and that said Letters Patent are hereby corrected as shown below:

Column 1, line 31, "America, tilted" should read -- titled --; line 37, "percent invention" should read -- present invention --;

Column 2, line 11, "PbMpO$_4$" should read -- PbMoO$_4$ --; line 23, "a an" should read -- at an --;

Column 3, line 1, after "as" insert -- the --; line 12, "Xy" should read -- XY --; line 29, after "can be" insert -- provided for --; line 35, "from" should read -- for --;

Column 5, line 34, cancel "optically frequency related means; intensity" and insert -- a frequency related --;

Column 6, line 2, after "medium means" insert -- ; --.

Signed and sealed this 18th day of July 1972.

(SEAL)
Attest:

EDWARD M. FLETCHER, JR.　　　　ROBERT GOTTSCHALK
Attesting Officer　　　　　　　　Commissioner of Patents